United States Patent
Shen et al.

(10) Patent No.: US 10,540,344 B2
(45) Date of Patent: Jan. 21, 2020

(54) UTILIZING NONCE TABLE TO RESOLVE CONCURRENT BLOCKCHAIN TRANSACTION FAILURE

(71) Applicant: Alibaba Group Holding Limited, George Town (KY)

(72) Inventors: Chao Shen, Hangzhou (CN); Kailai Shao, Hangzhou (CN); Xuming Lu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/390,287

(22) Filed: Apr. 22, 2019

(65) Prior Publication Data

US 2019/0243820 A1   Aug. 8, 2019

Related U.S. Application Data

(63) Continuation of application No. PCT/CN2018/118523, filed on Nov. 30, 2018.

(51) Int. Cl.
　　*G06F 16/00*　　(2019.01)
　　*G06F 16/23*　　(2019.01)

(52) U.S. Cl.
　　CPC ...... *G06F 16/2365* (2019.01); *G06F 16/2379* (2019.01)

(58) Field of Classification Search
　　CPC .................... G06F 16/2379; G06F 16/2365
　　USPC .................................................. 707/600–899
　　See application file for complete search history.

(56) References Cited

U.S. PATENT DOCUMENTS

| | | | | |
|---|---|---|---|---|
| 7,788,700 B1 * | 8/2010 | Feezel | ..................... | G06F 21/31 713/163 |
| 7,797,751 B1 * | 9/2010 | Hughes | ................... | G06F 21/64 726/26 |
| 8,104,073 B2 * | 1/2012 | Hanna | ..................... | H04L 63/12 713/168 |

(Continued)

FOREIGN PATENT DOCUMENTS

| | | |
|---|---|---|
| CN | 108416578 | 8/2018 |
| CN | 108572978 | 9/2018 |
| CN | 108805569 | 11/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Michelle N Owyang
(74) *Attorney, Agent, or Firm* — Fish & Richardson P.C.

(57) ABSTRACT

Implementations of the present disclosure include initializing a nonce table comprising a plurality of nonce slots, each nonce slot being associated with a nonce index and a status, and storing a respective nonce value; receiving a request for a nonce value from an application, and in response, requesting a nonce value from the nonce table; receiving a nonce value in response to the request, a status of a nonce slot corresponding to the nonce value being set to occupied; and in response to a transaction using the nonce value being one of successful and failed, executing one of: releasing the nonce value within the nonce slot and setting the status to unoccupied, if the transaction is successful, and setting the status to unoccupied, if the transaction failed.

12 Claims, 6 Drawing Sheets

(56) References Cited

U.S. PATENT DOCUMENTS

| | | | | |
|---|---|---|---|---|
| 8,918,635 | B2* | 12/2014 | Kim | H04L 9/008 |
| | | | | 713/153 |
| 9,094,818 | B2* | 7/2015 | Falk | H04L 9/3242 |
| 9,794,074 | B2* | 10/2017 | Toll | G06Q 40/04 |
| 10,237,259 | B2* | 3/2019 | Ronda | H04L 9/08 |
| 10,243,990 | B1* | 3/2019 | Chen | H04L 63/1466 |
| 10,275,739 | B2* | 4/2019 | Hanis | G06Q 10/087 |
| 2003/0131238 | A1* | 7/2003 | Vincent | H04L 9/32 |
| | | | | 713/176 |
| 2015/0180894 | A1* | 6/2015 | Sadovsky | G06F 3/0481 |
| | | | | 726/22 |
| 2015/0332283 | A1* | 11/2015 | Witchey | G06Q 30/018 |
| | | | | 705/3 |
| 2016/0292672 | A1 | 10/2016 | Fay et al. | |
| 2018/0204191 | A1 | 7/2018 | Wilson et al. | |
| 2019/0130391 | A1* | 5/2019 | Wright | G06F 21/30 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2018/118523, dated Sep. 2, 2019, 7 pages.

* cited by examiner

UTILIZING NONCE TABLE TO RESOLVE CONCURRENT BLOCKCHAIN TRANSACTION FAILURE

CROSS-REFERENCE TO RELATED APPLICATIONS

This application is a continuation of PCT Application No. PCT/CN2018/118523, filed on Nov. 30, 2018, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

In blockchain networks, a consensus protocol is executed to add transactions to blocks of a blockchain. The consensus protocol can operate based on nonces (e.g., arbitrary numbers that are each used once), each node in the block chain consuming a nonce. For example, for each transaction that is to be added, each node consumes a nonce in an effort to add the transaction to a block in the blockchain. In most cases, transactions can be concurrent, which can result in the same nonce being used by multiple nodes. Consequently, one or more of the concurrent transactions may fail.

SUMMARY

Implementations of the present disclosure include computer-implemented methods for mitigating concurrent transaction failures in blockchain networks. More particularly, implementations of the present disclosure are directed to a nonce table with a plurality of pre-populated nonces to avoid nonce collision in processing of concurrent transactions in blockchain networks.

In some implementations, actions include initializing a nonce table comprising a plurality of nonce slots, each nonce slot being associated with a nonce index and a status, and storing a respective nonce value; receiving a request for a nonce value from an application, and in response, requesting a nonce value from the nonce table; receiving a nonce value in response to the request, a status of a nonce slot corresponding to the nonce value being set to occupied; and in response to a transaction using the nonce value being one of successful and failed, executing one of: releasing the nonce value within the nonce slot and setting the status to unoccupied, if the transaction is successful, and setting the status to unoccupied, if the transaction failed. Other implementations include corresponding systems, apparatus, and computer programs, configured to perform the actions of the methods, encoded on computer storage devices.

These and other implementations may each optionally include one or more of the following features: releasing the nonce value within the nonce slot includes storing an incremented nonce value in the nonce slot; receiving a second request for a nonce value from the application, and in response, requesting a nonce value from the nonce table, and determining that a status of each nonce slot in the nonce table is occupied, and in response, transmitting an indication to the application that all nonce slots are occupied; the nonce table is stored in a database, and a bridge between the application and the database receives requests for nonce values, and selectively provides nonce values to the application; the application determines whether the transaction using the nonce value is one of successful and failed based on one or more messages received by the application from the blockchain network; and a status of the transaction is periodically triggered to determine whether a timeout event has occurred.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
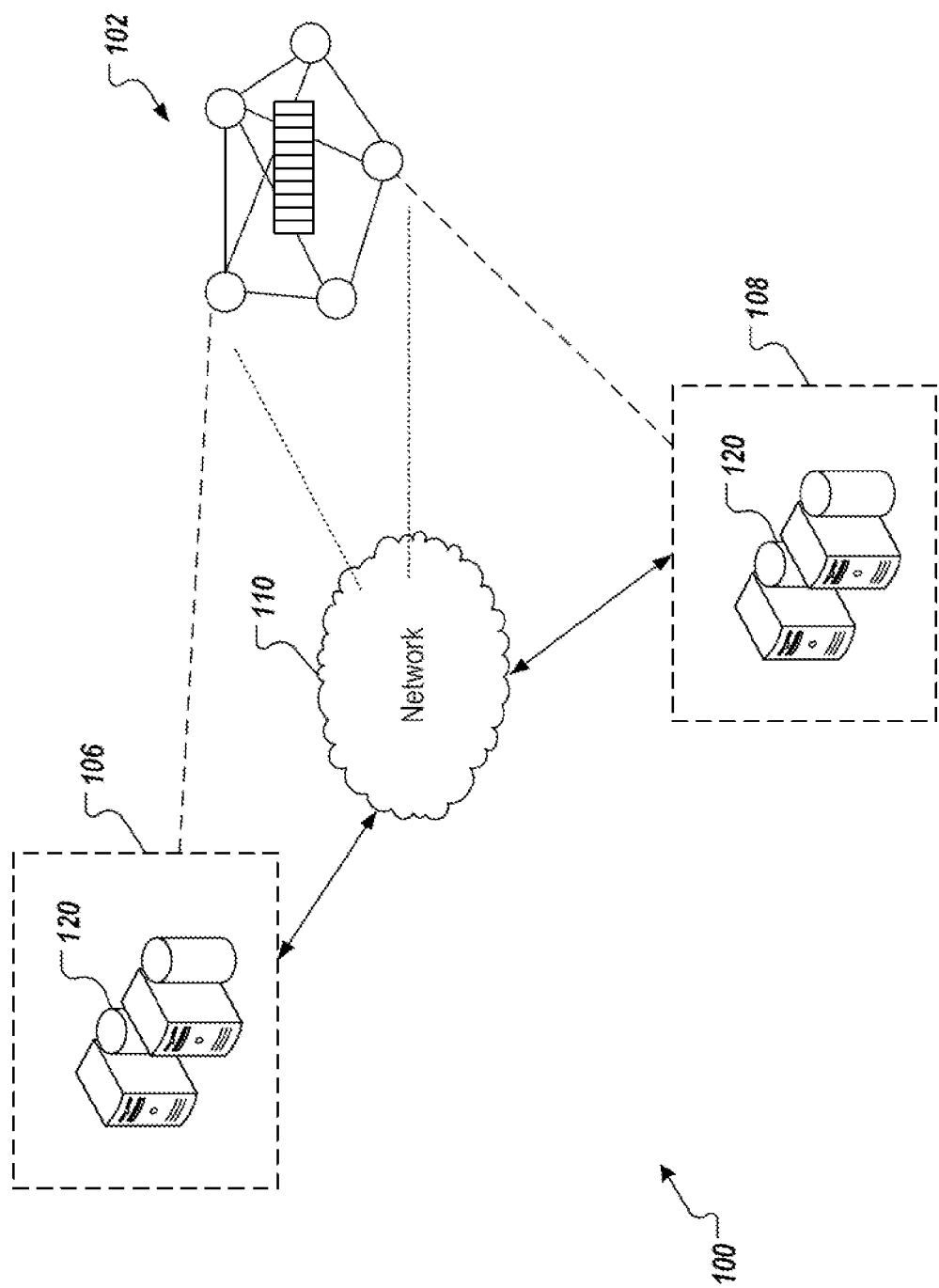
FIG. 1 depicts an example environment that can be used to execute implementations of the present disclosure.

Implementations of the present disclosure include computer-implemented methods for mitigating concurrent transaction failures in blockchain networks. More particularly, implementations of the present disclosure are directed to a nonce table with a plurality of pre-populated nonces to avoid nonce collision in processing of concurrent transactions in blockchain networks. In some implementations, actions include initializing a nonce table including a plurality of nonce slots, each nonce slot being associated with a nonce index and a status, and storing a respective nonce value, receiving a request for a nonce value from an application, and in response, requesting a nonce value from the nonce table, receiving a nonce value in response to the request, a status of a nonce slot corresponding to the nonce value being set to occupied, and in response to a transaction using the nonce value being one of successful and failed, executing one of: releasing the nonce value within the nonce slot and setting the status to unoccupied, if the transaction is successful, and setting the status to unoccupied, if the transaction failed.

To provide further context for implementations of the present disclosure, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associate with the Bitcoin crypto-currency network, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. An example public blockchain network includes the Bitcoin network, which is a peer-to-peer payment network. The Bitcoin network leverages a distributed ledger, referred to as blockchain. As noted above, the term blockchain, however, is used to generally refer to distributed ledgers without particular reference to the Bitcoin network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in the Bitcoin network.

In general, a private blockchain network private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present disclosure are described in further detail herein with reference to a blockchain networks generally. It is contemplated that implementations of the present disclosure can be realized in any appropriate type of blockchain network.

As introduced above, a consensus protocol is executed within a blockchain network to add blocks to a blockchain. Each block can be described as a bundle of transactions executed between entities in the blockchain network. Multiple nodes within the blockchain network compete through the consensus protocol to have their block added to the blockchain. Transactions and blocks are recorded using nonces. That is, each node participating in the consensus protocol uses a nonce. In some examples, a nonce is a random (arbitrary) number (e.g., of fixed length) that is used only once. For example, if a nonce is used to successfully record a transaction to the blockchain, that nonce is not used again. In further detail, each transaction written to the blockchain uses a nonce. The nonce can be used in a plurality of manners. For example, the nonce can be concatenated to the hash value of a transaction block, so the hash will be less than or equal to the target of the network. As another example, the nonce may be concatenated with a transaction value that is to be hashed.

In some instances, transactions can be concurrent. Consequently, a significant number of nonces can be concurrently required to record transactions to the blockchain. It can occur that two or more nodes concurrently use the same nonce. If one node is successful in adding its transaction to the blockchain, the nonce is no longer valid for use, and the other node(s) will fail in their effort to record their transaction(s) to the blockchain.

Implementations of the present disclosure are described in further detail herein in view of the above context. More particularly, and as introduced above, implementations of the present disclosure are directed to a nonce table with a plurality of pre-populated nonces to avoid nonce collision in processing of concurrent transactions in blockchain networks. As described in further detail herein, a preemption model is employed, such that, while a nonce from the nonce table is in use by a node, the nonce is unavailable for use by any other node. If the transaction is successful, the nonce is deleted from the nonce table, and a new nonce is provided in its place. If the transaction is not successful, the nonce is released for use, and remains in the nonce table for reuse in a subsequent transaction.

FIG. 1 depicts an example environment 100 that can be used to execute implementations of the present disclosure.

In some examples, the example environment 100 enables entities to participate in a blockchain network 102. The example environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the blockchain network 102. Example computing devices include, without limitation, a server, a desktop computer, a laptop computer, a tablet computing device, and a smartphone. In some examples, the computing systems 106, 108 hosts one or more computer-implemented services for interacting with the blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users).

In the example of FIG. 1, the blockchain network 102 is represented as a peer-to-peer network of nodes, and the computing systems 106, 108 provide nodes of the first entity, and second entity respectively, which participate in the blockchain network 102.

Figure 2:
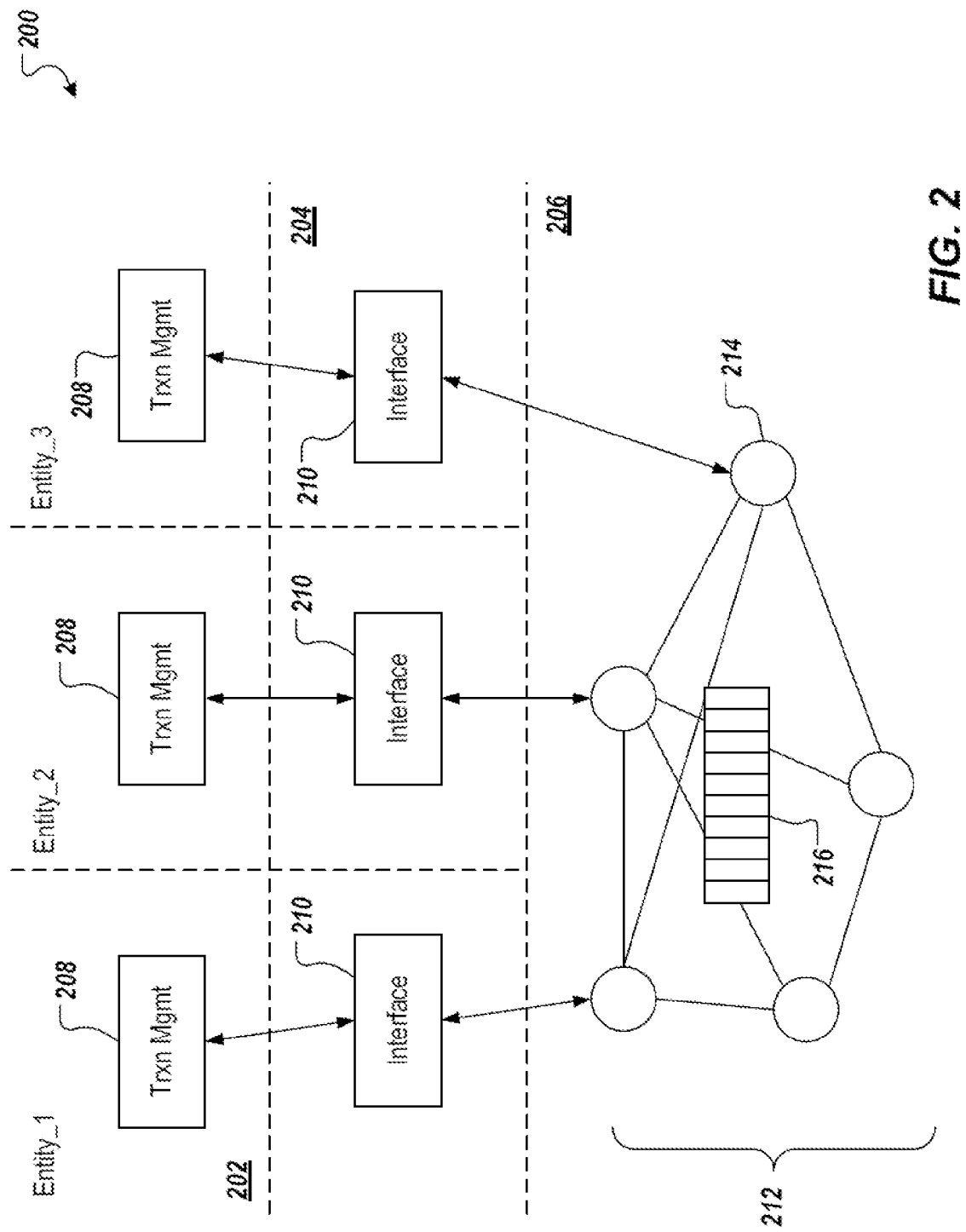
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicates with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the blockchain network 212.

Figure 3:
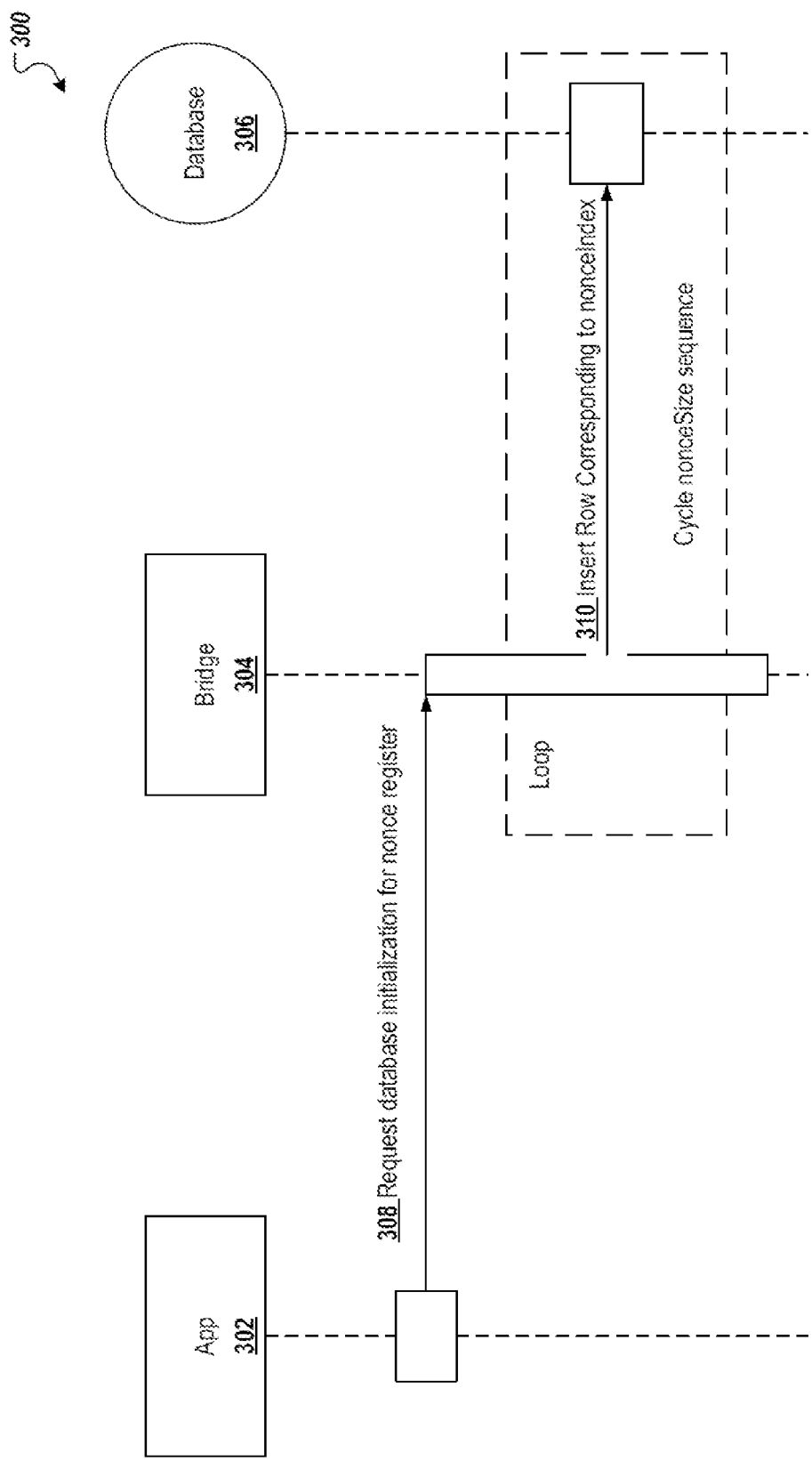
FIG. 3 depicts an example signal flow to initialize a nonce table in accordance with implementations of the present disclosure.

FIG. 3 depicts an example signal flow 300 to initialize a nonce table (nonceTable) in accordance with implementations of the present disclosure. For convenience, the signal flow 300 will be described as being performed between components within a blockchain network. As described in further detail herein, the nonce table records a plurality of nonces, which can be used, for example, in execution of a consensus protocol within the blockchain network to record transactions to a blockchain within the blockchain network. The nonce table can store tens, hundreds, thousands, or any appropriate number of nonce values. In some examples, the size of the nonce table is configured based on an expected number, and/or frequency of nonces to be retrieved. In some examples, the size of the nonce table can be chosen in a variety of manners. For example, the size can be randomly initialized, pre-determined based on an account type. As another example, the size can be defined in a request to initialize the nonce table. In some implementations, the nonce table includes rows, each row recording a nonce index (nonceIndex), a nonce (nonceValue), and nonce index status (nonceIndexStatus).

In the example of FIG. 3, the signal flow 300 is between an application 302 (e.g., executed within a node of the blockchain network), a bridge 304, and a database 306. The bridge 304 is hosted together with the client side applications. The database 306 stores the nonce table that is used by the application 302.

In some implementations, the application 302 sends (308) a request to initialize a nonce table. In some examples, this occurs after a blockchain account associated with the application 302 is created. The bridge 304 abstracts a model and service implementation of the blockchain client to maintain the nonce table. The bridge 304 sits between the application 302, and the database 306 to facilitate initialization of the nonce table.

In some implementations, the bridge 304 initializes each nonce index in the nonce table by looping through the nonce table size. The nonce table is stored in the database 306. The bridge 304 inserts (310) a row corresponding to each nonce index. Each nonce index may have one or more associated values with it. Example values include, without limitation, an identifier, an account address, a nonce version, a nonce index, a nonce, an occupied status, and a last occupied time. The variables corresponding to the nonce value characterize the nonce. For example, the identifier is a unique reference to the nonce, the account address may refer to one or more accounts associated with transactions, the nonce version may specify which variant of the nonce is used, and occupied indicates the availability of the nonce for a transaction. In some examples, the last occupied time can be used to determine whether a timeout has occurred, and must be released as described in further detail herein.

Figure 4:
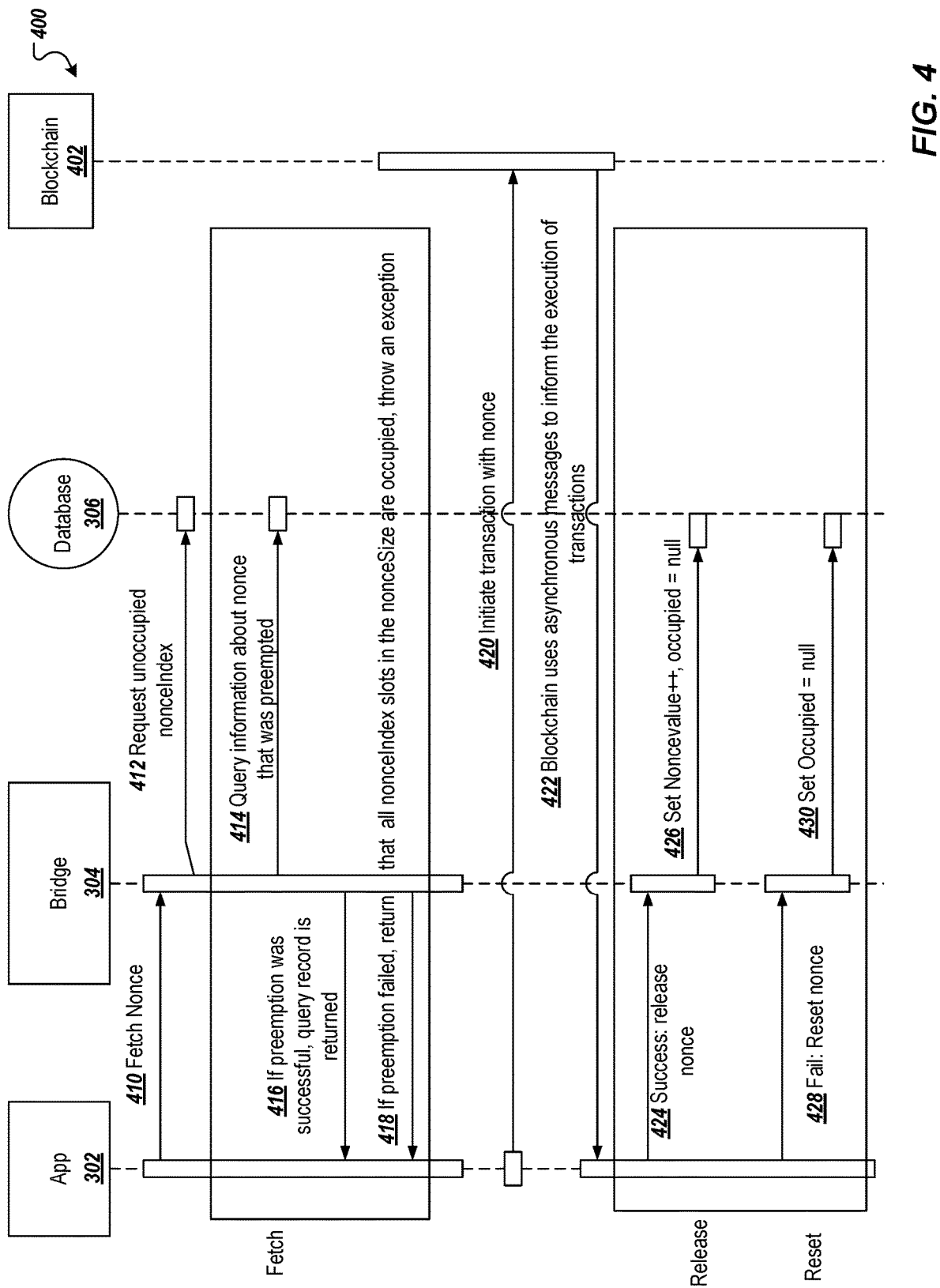
FIG. 4 depicts an example signal flow to fetch, release, and reset nonce values from the nonce table in accordance with implementations of the present disclosure.

FIG. 4 depicts an example signal flow 400 to fetch, release, and reset nonce values from the nonce table in accordance with implementations of the present disclosure. For convenience, the signal flow 400 will be described as being performed between components within a blockchain network. In the example of FIG. 4, the signal flow 400 is between the application 302 (e.g., executed within a node of the blockchain network), the bridge 304, the database 306, and a blockchain 408.

In accordance with implementations of the present disclosure, a preemption model is used such that, while a nonce from the nonce table is in use by a node (e.g., the application 302), the nonce is unavailable for use by any other node. If the transaction is successful, the nonce is deleted from the nonce table, and a new nonce is provided in its place. If the transaction is not successful, the nonce is released for use, and remains in the nonce table for reuse in a subsequent transaction. By preempting the nonce, while in use, concurrent transactions are unable to use the same nonce, avoiding transaction failures. In some implementations, and as described in further detail herein, the preemption model includes operation primitives of fetch, release and reset.

In some implementations, the fetch operation obtains a nonce value to be used in the blockchain transaction. The application 302 sends (410) a fetch nonce message to the bridge 304. In turn, the bridge 304 queries the database 306 to request (412) an unoccupied nonce index. Querying the database for a nonce can be executed by the following example SQL statements:

```
update nonce_table
set
    occupied = #uuid#,
    last_occupied_time = now,
where id in (
    select
        id
    from nonce_table
    where
        account_address = #account_address# and
        occupied is null
    order by nonce_index asc
    limit 1
)
```

In some examples, the SQL statement selects all the nonce indices with an occupied status set to null, and chooses the smallest nonce index to be preempted (e.g., occupied). The last occupied time of the selected nonce index is set to 'now' (e.g., a current timestamp) to prevent the respective nonce value from being used in another transaction.

If preemption is successful, the bridge 304 queries (414) information about the nonce index that was preempted (e.g., the nonce), and the nonce is returned (416) to the application 302. Information about the nonce index can be queried using the following example SQL query:

```
select
    id,
    account_address,
    nonce_version,
    nonce_index,
    nonce_value,
    occupied,
    last_occupied_time
from nonce_table
where
    occupied = #uuid#
```

The example SQL statement selects all of the nonce information from the nonce table based on the occupied status specified in the initial query for a nonce value.

However, if retrieval of a nonce is unsuccessful (e.g., all nonce indices are occupied), the database 306 returns an update value of zero, the bridge 304 returns (418) that all nonce index slots in the nonce table are occupied, and throws an exception.

The selected nonce value is used to initiate (420) recording of a transaction in the blockchain 408. Through execution of the consensus protocol, the blockchain 408 sends (422) asynchronous messages to inform nodes of the blockchain network on statuses of transactions. Such asynchronous messages are received by the application 302. The blockchain system does not guarantee the asynchronous message must be successfully delivered. If the asynchronous message indicating the status of the transaction is not returned to the application 302, the occupied status of the nonce index and the nonce value cannot be reset, and remains unavailable for use with subsequent transactions.

In some implementations, the application 302 receives a message indicating that the transaction was either successful, or failed. If the transaction was successful the application informs (424) the bridge 304, and the bridge 304 releases the nonce index for future use. In some examples, release includes updating the nonce (e.g., incrementing a value of the nonce), and setting the occupied status to null. Updating of the nonce value ensures that only new nonces are used, and previously used nonces remain unavailable for future transactions. If the transaction was not successful, the application 302 informs (428) the bridge 304, and the bridge resets the nonce index by updating the occupied status to null. That is, the nonce remains unchanged, and is again made available for use in a future transaction. Example first and second SQL statements can be provided as:

```
update nonce_table
set
    occupied = NULL,
    last_occupied_time = NULL,
    nonce_value = nonce_value+1
where
    account_address = #accountAddress# and
    nonce_index = #nonceIndex#
update nonce_table
set
    occupied = NULL,
    last_occupied_time = NULL,
where
    account_address = #accountAddress# and
    nonce_index = #nonceIndex#
```

The example first SQL statement can be executed for release (e.g., in response to transaction success), and the example second SQL statement can be executed for reset (e.g., in response to transaction failure).

Figure 5:
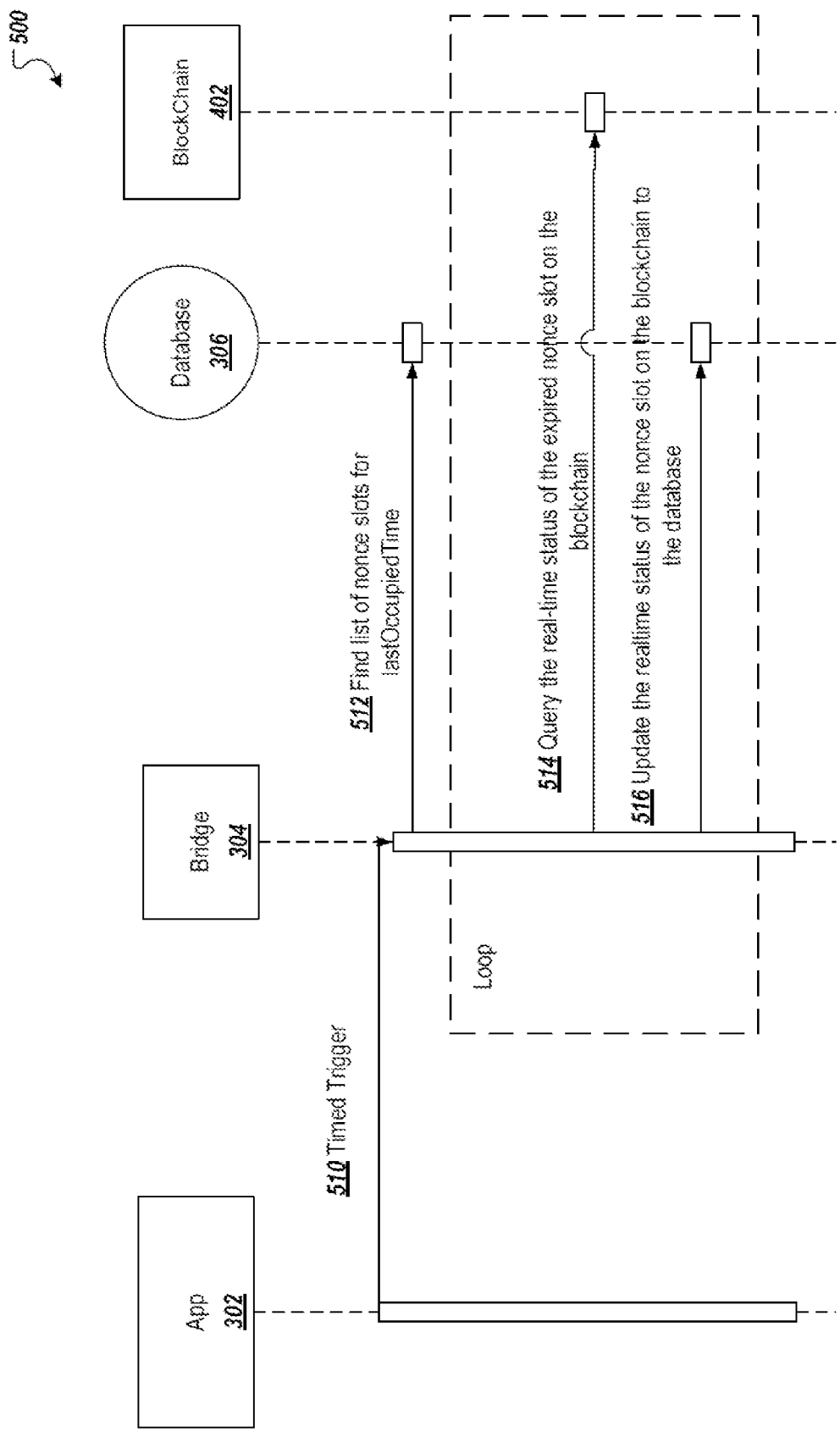
FIG. 5 depicts an example signal flow to update available nonce values in the nonce table in accordance with implementations of the present disclosure.

FIG. 5 depicts an example signal flow 500 to update available nonce values in the nonce table in accordance with implementations of the present disclosure. For convenience, the signal flow 500 will be described as being performed between components within a blockchain network. In the example of FIG. 5, the signal flow 500 is between the application 302 (e.g., executed within a node of the blockchain network), the bridge 304, the database 306, and the blockchain 402.

As noted above, because the blockchain 402 does not guarantee that the delivered message must be successfully delivered to the application 302, some nonce slots are occupied, and do not wait for the message to release/reset. In view of this, implementations of the present disclosure provide a daemon task to periodically check all occupied nonce index slots. In some examples, the last occupied time of each nonce index slot is used to determine whether a timeout has occurred, and whether the daemon task is to release/reset the nonce index slot.

In the example of FIG. 5, the application 302 sends (510) a timed trigger to the bridge 304. In response, the bridge queries (512) the database 306 for a list of nonce indices with a last occupied time not set to null. This allows all of the nonce index values to be updated by using a single method to update the respective values returned from the select statement. The bridge 304 loops through each value in the list returned from the database 306 to query (514) the real-time status of the respective nonce value in the blockchain 402. The bridge 304 receives the update, and updates (516) the last occupied time status within the database 306 based on the results returned from the blockchain 402. If a time-out occurs (e.g., a difference between a current time, and the last occupied time is greater than a threshold time), the bridge 304 directly queries the real-time status corresponding to the nonce slot of the blockchain 402, and updates the database 306. When updating the database 306, the occupancy status is set to null, and the nonce value is the real-time query result from the blockchain 402.

Figure 6:
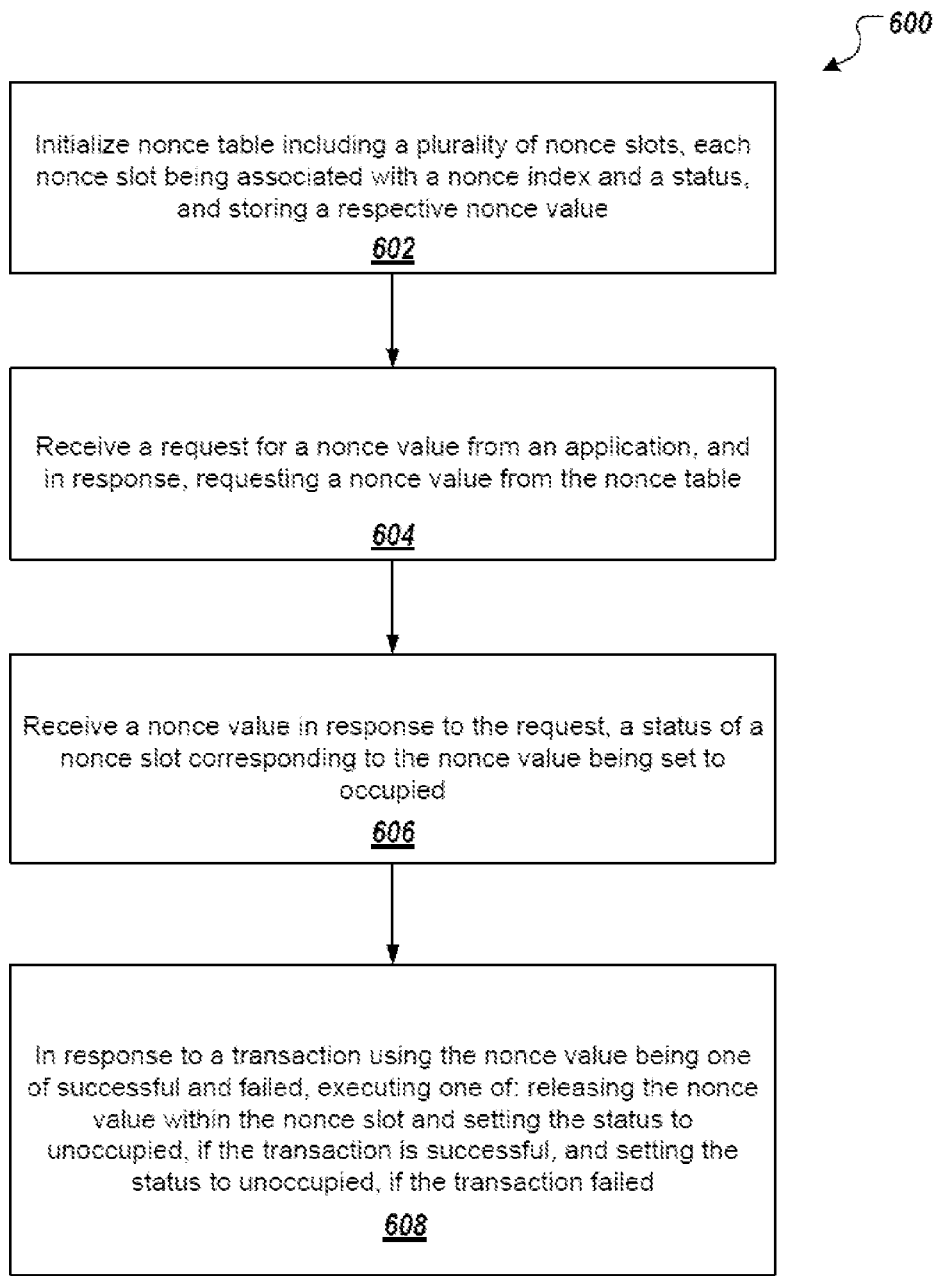
FIG. 6 depicts an example process of maintaining a nonce table that can be executed in accordance with implementations of the present disclosure.

FIG. 6 depicts an example process 600 that can be executed in accordance with implementations of the present disclosure. In some implementations, the example process 600 may be performed using one or more computer-executable programs executed using one or more computing devices. The example process 600 is based on one or more of the above-described signal flows. In general, the example process is directed to use of a nonce table in accordance with implementations of the present disclosure.

A nonce table is initialized (602). As described herein, for example, with reference to FIG. 3, the nonce table includes a plurality of nonce slots, each nonce slot being associated with a nonce index and a status, and storing a respective nonce value. A request for a nonce is received (604). For example, and as described herein with reference to FIG. 4, the request is received by an application, and in response, and a nonce is requested from the nonce table by a bridge. A nonce value is received in response to the request (606). As described herein, a status of a nonce slot corresponding to the nonce value being set to occupied (e.g., the fetch operation of FIG. 4). In response to a transaction using the nonce value being one of successful and failed, one of the following is executed (610): releasing the nonce value within the nonce slot and setting the status to unoccupied, if the transaction is successful, and setting the status to unoccupied, if the transaction failed. This is described with reference to the release and reset operations of FIG. 4.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing nonce values for transaction processing in a blockchain network, the method being executed by one or more processors, and comprising:

initializing, on one or more computing devices in a blockchain network having a plurality of participating nodes processing a plurality of blockchain transactions, a nonce table comprising a plurality of nonce slots, each nonce slot storing a nonce value usable in a respective blockchain transaction of the plurality of blockchain transactions, and being associated with a respective nonce index and a status, the nonce values being random numbers for recording blockchain transactions in a particular blockchain within the blockchain network, and the status indicating an availability of a corresponding nonce value for use in a blockchain transaction;

receiving, in the blockchain network, a first request for a particular nonce value from an application processing the blockchain transaction;

in response to receiving the first request, generating a second request for the particular nonce value from a respective nonce slot of the nonce table and setting a status of the respective nonce slot to occupied;

receiving, in the blockchain network, the particular nonce value in response to the second request;

determining, by the one or more computing devices based on one or more received messages, whether the blockchain transaction using the particular nonce value is a success or a failure;

in response to determining that the blockchain transaction is a success:
  deleting the particular nonce value within the respective nonce slot,
  generating a new nonce value for the respective nonce slot after the deletion, and
  setting the status of the respective nonce slot to unoccupied; and in response to determining that the blockchain transaction is a failure:
  setting the status of the respective nonce slot to unoccupied,
  releasing the particular nonce value,
  maintaining the particular nonce value in the respective nonce slot, and
  reusing the particular nonce value in a subsequent blockchain transaction.

2. The method of claim 1, wherein deleting the particular nonce value within the respective nonce slot comprises storing an incremented nonce value in the nonce slot.

3. The method of claim 1, wherein the nonce table is stored in a database, and a bridge between the application and the database receives requests for nonce values, and selectively provides nonce values to the application.

4. The method of claim 1, wherein a status of the blockchain transaction is periodically triggered to determine whether a timeout event has occurred.

5. A non-transitory computer-readable storage medium coupled to one or more processors and having instructions stored thereon which, when executed by the one or more processors, cause the one or more processors to perform operations for providing nonce values for transaction processing in blockchain networks, the operations comprising:
  initializing, on one or more computing devices in a blockchain network having a plurality of participating nodes processing a plurality of blockchain transactions, a nonce table comprising a plurality of nonce slots, each nonce slot storing a nonce value usable in a respective blockchain transaction of the plurality of blockchain transactions, and being associated with a respective nonce index and a status, the nonce values being random numbers for recording blockchain transactions in a particular blockchain within the blockchain network, and the status indicating an availability of a corresponding nonce value for use in a blockchain transaction;

receiving, in the blockchain network, a first request for a particular nonce value from an application processing the blockchain transaction;

in response to receiving the first request, generating a second request for the particular nonce value from a respective nonce slot of the nonce table and setting a status of the respective nonce slot to occupied;

receiving, in the blockchain network, the particular nonce value in response to the second request;

determining based on one or more received messages, whether the blockchain transaction using the particular nonce value is a success or a failure;

in response to determining that the blockchain transaction is a success:
  deleting the particular nonce value within the respective nonce slot,
  generating a new nonce value for the respective nonce slot after the deletion, and
  setting the status of the respective nonce slot to unoccupied; and in response to determining that the blockchain transaction is a failure:
  setting the status of the respective nonce slot to unoccupied,
  releasing the particular nonce value,
  maintaining the particular nonce value in the respective nonce slot, and
  reusing the particular nonce value in a subsequent blockchain transaction.

6. The non-transitory computer-readable storage medium of claim 5, wherein deleting the particular nonce value within the respective nonce slot comprises storing an incremented nonce value in the nonce slot.

7. The non-transitory computer-readable storage medium of claim 5, wherein the nonce table is stored in a database, and a bridge between the application and the database receives requests for nonce values, and selectively provides nonce values to the application.

8. The non-transitory computer-readable storage medium of claim 7, wherein a status of the blockchain transaction is periodically triggered to determine whether a timeout event has occurred.

9. A system, comprising:
  a computing device; and
  a computer-readable storage device coupled to the computing device and having instructions stored thereon which, when executed by the computing device, cause the computing device to perform operations for providing nonce values for transaction processing in blockchain networks, the operations comprising:
    initializing in a blockchain network having a plurality of participating nodes processing a plurality of blockchain transactions, a nonce table comprising a plurality of nonce slots, each nonce slot storing a nonce value usable in a respective blockchain transaction of the plurality of blockchain transactions, and being associated with a respective nonce index and a status, the nonce values being random numbers for recording blockchain transactions in a particular blockchain within the blockchain network, and the status indicating an availability of a corresponding nonce value for use in a blockchain transaction, receiving a first request for a particular nonce value from an application processing the blockchain transaction, in response to receiving the first request, generating a second request for the particular nonce value from a respective nonce slot of the nonce table and setting a status of the respective nonce slot to occupied, receiving the particular nonce value in response to the second request;

determining based on one or more received messages, whether the blockchain transaction using the particular nonce value is a success or a failure;

in response to determining that the blockchain transaction is a success:

deleting the particular nonce value within the respective nonce slot, generating a new nonce value for the respective nonce slot after the deletion, and setting the status of the respective nonce slot to unoccupied, and in response to determining that the blockchain transaction is a failure:

setting the status of the respective nonce slot to unoccupied, releasing the particular nonce value, maintaining the particular nonce value in the respective nonce slot, and reusing the particular nonce value in a subsequent blockchain transaction.

10. The system of claim 9, wherein deleting the particular nonce value within the respective nonce slot comprises storing an incremented nonce value in the nonce slot.

11. The system of claim 9, wherein the nonce table is stored in a database, and a bridge between the application and the database receives requests for nonce values, and selectively provides nonce values to the application.

12. The system of claim 9, wherein a status of the blockchain transaction is periodically triggered to determine whether a timeout event has occurred.

* * * * *

UNITED STATES PATENT AND TRADEMARK OFFICE
CERTIFICATE OF CORRECTION

PATENT NO. : 10,540,344 B2
APPLICATION NO. : 16/390287
DATED : January 21, 2020
INVENTOR(S) : Chao Shen, Kailai Shao and Xuming Lu It is certified that error appears in the above-identified patent and that said Letters Patent is hereby corrected as shown below:

In the Claims

In Claim 8, Column 12, Line 45, delete "claim 7," and insert -- claim 5, --, therefor.

Signed and Sealed this
Thirteenth Day of October, 2020

Andrei Iancu
*Director of the United States Patent and Trademark Office*